United States Patent

[11] 3,563,186

[72] Inventors Paul V. Piper Hayward; Harold B. Wells, Oakland, Calif.
[21] Appl. No. 771,923
[22] Filed Oct. 30, 1968
[45] Patented Feb. 16, 1971
[73] Assignee The Singer Company a corporation of New Jersey

[54] BIDIRECTIONAL POSITIONING STAGE
4 Claims, 3 Drawing Figs.

[52] U.S. Cl. .... 108/143, 269/71
[51] Int. Cl. .... A47b 11/00
[50] Field of Search .... 269/58, 71; 350/81, 86; 108/137, 136, 143

[56] References Cited

UNITED STATES PATENTS

| | | | |
|---|---|---|---|
| 2,394,175 | 2/1946 | Hill | 269/71 |
| 3,148,873 | 9/1964 | Chandler | 269/71 |
| 3,204,584 | 9/1965 | Mladjan | 108/143 |
| 3,393,648 | 7/1968 | Diehr | 108/137X |

*Primary Examiner*—James T. McCall
*Attorneys*—Charles R. Lepchinsky and Norman N. Kunitz

ABSTRACT: A bidirectional stage is disclosed in which the said bidirectional stage may be moved independently in either of two directions while maintaining contact with a stationary reference plane. A guide or motion control member is provided between the reference member and plane and the bidirectional member. The guide member is restricted to a first linear reciprocal motion with respect to the reference member; while the bidirectional stage is restricted to a second linear reciprocal motion with respect to the guide member. The guide member does not support or provide any planar reference for the bidirectional member which refers only to the stationary reference plane.

PATENTED FEB 1 6 1971

3,563,186

INVENTORS

PAUL V. PIPER

HAROLD B. WELLS

BY

GEORGE W. KILLIAN

*AGENT*

BIDIRECTIONAL POSITIONING STAGE

This invention relates to a bidirectional stage and, more particularly, to a new and improved means for providing bidirectional motion of a stage while maintaining a given plane of said stage in a single plane without any tilt or other unwanted component of motion.

Stages which may be moved in first and/or second mutually perpendicular linear directions have been used for many years for various purposes. A few of these purposes include: microscope work for positioning the subject and lens relative to each other; photographic work for positioning the subject and/or film in the desired position relative to each other; optical comparators for positioning small parts for examination; and a wide variety of metal and wood working machinery. In some applications the ability to move a stage in a bidirectional manner without producing any motion along a third axis is quite important. The microminiaturization of circuits, the production of integrated circuit chips and various other modern developments have increased the need for an accurate bidirectional stage which remains in a single reference plane.

The prior art techniques usually employed a reference plane which had supported thereon an intermediate part which was arranged for reciprocal linear motion on said reference plane. Supported on said intermediate part was a stage which was arranged for reciprocal linear motion at right angles to the linear motion of said intermediate part. This construction required that the said intermediate part be made accurately as if its principal planes were not actually parallel to each other and the reference plane an undesired third component of motion would be imparted to the said stage as it was moved relative to the intermediate part.

The present invention provides a coupling means wherein the part which might be thought to correspond to the aforesaid intermediate part may be relatively cheap part with no requirement that it have top and bottom parallel planes. More specifically, in the present invention the bidirectional stage is maintained in constant contact with the stationary reference plane.

Objects, advantages and features of the invention will become apparent as the following description proceeds. Features of novelty which characterize the invention will be pointed out in particularity in the claims annexed to and forming a part of this application.

For a better understanding of the invention, reference may be had to the accompanying FIGS. which illustrate two embodiments of the invention and in which.

Figures 1, 2, 3:
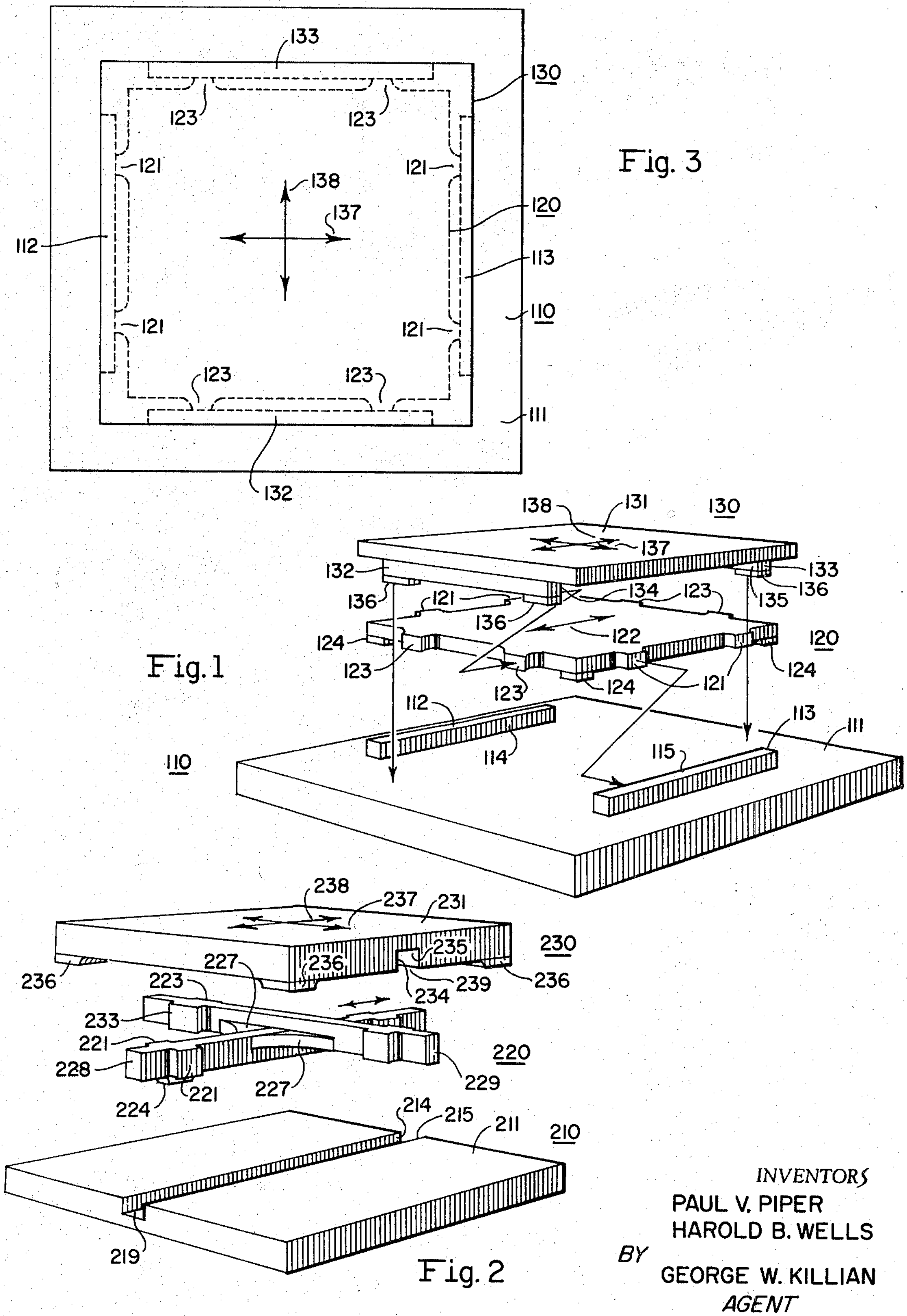
FIG. 1 is an exploded view of one embodiment of the invention.
FIG. 2 is an exploded view of another embodiment of the invention.
FIG. 3 is a top view of the embodiment illustrated in FIG. 1.

It should be understood that only the details which are necessary to understand and use the inventive concept, described and claimed herein, have been shown. For example, no specific type of bearings have been disclosed as the choice is an engineering matter which is dictated by other considerations such as the extent of the motion required, the weight of the members and/or the object supported by the stage; the force available for producing the bidirectional motion and the time available for moving from one position to another. In a like manner a specific means for moving the stage in each of its two directions of motion is not illustrated as this too is a matter of choice and does not form a part of the present invention.

DETAILED DESCRIPTION

It is believed that the concept and operation of the invention may best be understood by considering the drawing in combination with the following detailed description.

A first embodiment of the invention is shown in FIG. 1 with the three principal parts shown in an exploded view. The parts may be mentally assembled in their operative relationship by positioning them as indicated by the arrows until parts 120 and 130 come to rest on part 110, all as illustrated in FIG. 3 for the embodiment of FIG. 1.

Part 110 is a reference plate and includes a reference plane 111 which is made as flat as may be required for the nature of the application. For the purposes this description, reference plate 110 will be considered as stationary with respect to the other members not attached thereto. Attached to the reference plate 110 are first and second parallel direction elements or guides 112 and 113. Face 114 of direction guide 112 and the corresponding inner face 115 of direction guide 113 (this last-named face not being visible in FIG. 1) are planar and parallel.

Part 120 is a guide member or central plate having appropriate bearings 121 which contact faces 114 and 115 of direction guides 112 and 113, respectively, so that guide member 120 may be reciprocated linearly in the direction of arrow 122. In addition, guide member 120 may have bottom bearings 124 for supporting the guide member 120 on plane 111. In addition, guide member 120 includes bearings 123 which serve a function and purpose to be described hereinafter. It should be noted that the top and bottom surfaces of guide member 120 do not need to be made with any precision and, more specifically, the top and bottom planes of guide 120 are not required to be flat as is the reference plane 111. Naturally, the bearing surfaces of bearings 124 must be in a single plane. In a similar manner the bearing surfaces of bearings 121, and 123, must be in appropriate planes. These requirements may be met by providing adjustments as may be required. In one application air bearings were found to be useful.

Bidirectional stage member 130 includes a top plane 131 at least part of which would normally be made with the same precision and accuracy as plane 111 of reference plate 110. However, for some applications this might not be required. Attached to the bidirectional stage member 130 are first and second parallel direction elements or guides 132 and 133. Face 135 of direction guide 133 and the corresponding inner face 134 of direction guide 132 (this last named face not being visible in FIG. 1) are planar and parallel. Appropriately attached to direction guide 132 and 133 are bearings 136 which contact face 111 of reference plate 110. Normally, adjustments would be provided for adjusting surface 131 of bidirectional stage member 130 so that the said surface is parallel to plane 111 of reference plate 110. The adjusting technique may take any convenient and appropriate form and is not illustrated herein as it does not form a part of the present invention.

The bearings 123 of guide member 120 contact faces 134 and 135 of parallel direction guides 132 and 133 so that the stage member 130 may be reciprocated relative to the guide member 120 in the linear direction illustrated by arrow 137.

Accordingly, when the three principal parts 110, 120 and 130 are assembled, it is possible to reciprocate the guide member 120 in the direction of arrow 122 relative to reference plate 110; with the parts assembled in their operative positions, the motion last referred to will also cause the bidirectional stage 130 to move in the same direction, i.e., reciprocate in the direction of arrow 138. In addition, stage 130 can be reciprocated relative to guide member 120 in the direction of arrow 137. It should be noted that the pairs of direction guides 112 and 113 and 132 and 133 tend to limit the extent of motion of the bidirectional stage. However, with appropriately selected dimensions of the various parts, this does not represent a limiting factor as in most applications it is not necessary to move the bidirectional stage more than a small portion of its length and/or width.

It is important to observe that the bidirectional plate 130 rests directly on stationary plane 111 of reference plate 110. More specifically, the guide member 120 provides no support to or for the stage 130. Accordingly, no matter how much the stage 130 is moved in either direction, its position is always referenced directly back to the reference plane 111. Of course, this means that the thickness of the guide member 120 (including any bearings used on its bottom surface) must be less than the vertical height of the direction guides 132 and 133 plus the bearings 136.

FIG. 2 illustrates an alternate structure which might be used. Insofar as parts correspond, they have been given identical identification numbers, except that the first digit is 2 instead of 1. That is, all elements illustrated and identified in FIG. 1 start with the digit 1 while the elements illustrated and identified in FIG. 2 start with the digit 2.

The reference plate 210 includes a reference plane 211 which has a notch 219. The opposite faces 214 and 215 of the notch 219 are parallel.

The guide member 220 is one rigid member with no potential relative motion between its arms 228 and 229. If circumstances require, braces or struts such as 227 could be added between the arms to eliminate any possible relative motion. As may be visualized from FIG. 2, the arm 228 fits into slot 219 and the bearings 221 engage planes 214 and 215 of slot 219. In addition, the bottom of arm 228 may have bearings 224 which engage the bottom plane of slot 219. In a like manner when the components are assembled, arm 229 fits into slot 239 and the bearings 223 engage planes 234 and 235 of slot 239.

As indicated with respect to the corresponding parts of FIG. 1, the bearings 236 engage the reference plane 211 at all times.

One feature of the embodiment illustrated in FIG. 2 is that no portion of the guide member 220 or any of its bearings need to rest upon surface 211. However, if desired, the arm 229 could have bearings on its bottom surface for engaging plane 211. It should be observed that no bearings are provided on the top of arm 229 as that surface does not engage the top surface of slot 239.

By providing appropriately designed bearings 121 and an appropriate redesign of surface 114 and 115, it would be possible to provide a bidirectional stage constructed as shown in FIG. 1 wherein the guide member 120 does not contact the reference plane 111. For example, ball and V-groove bearings between the guide 120 and the direction guides 112 and 113 could be used.

In many applications of the present invention, it would be convenient and appropriate to have a hole or aperture through the bidirectional stage 130, the guide means 120 and possibly through the reference plate 110. A construction as last described would be convenient for photographic or microscopic type work. An assembly made in accordance with that shown in FIG. 2 does not lend itself to a large central hole; however, it would be possible to employ one or more offcenter holes.

The invention as disclosed in the drawings constitutes a bidirectional positioning stage which may be reciprocated in either of two mutually perpendicular directions. It should be understood that the invention is not so limited. For example, the two directions of motion could have an included angle of 60°. This could be implemented by providing the guide member 120 in the shape of a parallelogram rather than the square or rectangle as shown. Of course, if this were done, then the corresponding direction guides, either those attached to the stage or those attached to the reference surface would have to be positioned in a corresponding relationship.

While there has been described what is considered at present to be a preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

We claim:

1. In a bidirectional positioning apparatus, the combination comprising:

a reference plate having a reference plane; and a bidirectional positioning plate slidably disposed directly and solely on said plane of said reference plate, wherein horizontal spacing of said positioning plate with respect to said reference plate as said positioning of plate slides on said reference plate is determined solely by said plane of said reference plate; and means disposed between said reference plate and said positioning plate for guiding and restricting movement of said positioning plate on said reference plate to reciprocal motion in a first straight line substantially parallel to said reference plane and reciprocal motion in a second straight line substantially parallel to said reference plane, said first straight line and said second straight line being orthogonal to each other.

2. In a bidirectional positioning system, the combination comprising:

a reference plate having a planar reference surface;

first linear direction guide means provided on said reference plate;

a bidirectional plate supported directly and solely on said reference surface of said reference plate;

second linear direction guide means provided on said bidirectional plate; and a single guide member in contact with said first guide means and said second guide means for restricting the relative motion between said reference plate and said bidirectional plate to reciprocal motion in two orthogonal directions.

3. In a bidirectional positioning system according to claim 2 wherein said first linear direction guide means comprises a first longitudinal extending groove having a pair of oppositely facing walls formed in said reference plate;

said second linear direction guide means comprises a second longitudinally extending groove having a pair of oppositely facing walls formed in said bidirection plate; and said single guide member includes at least one means extending into said first groove and bearing against said pair of oppositely facing walls of said first groove for restricting horizontal movement of said guide member in a first straight line direction parallel with the longitudinal direction of said first groove, and includes at least one means extending into said second groove and bearing against said pair of oppositely facing walls of said second groove for restricting horizontal movement of said bidirectional plate in a second straight line direction parallel with the longitudinal direction of said second groove.

4. In a bidirectional positioning system according to claim 2 wherein said first linear direction guide means comprising:

a first pair of spaced parallel longitudinally extending elements secured to said reference surface of said reference plate;

said second linear direction guide means comprises a second pair of spaced parallel longitudinally extending elements secured to said bidirection plate; and said single guide member includes at least one first pair of oppositely facing elements, respective ones of which bear against respective ones of said first pair of spaced parallel longitudinally extending elements for restricting horizontal movement of said guide member in a first straight line direction parallel with the longitudinal direction of said first pair of spaced parallel longitudinally extending elements, and includes at least one second pair of oppositely facing elements, respective ones of which bear against respective ones of said second pair of spaced longitudinally extending elements for restricting horizontal movement of said bidirectional plate in a second straight line direction parallel with the longitudinal direction of said second pair of longitudinal elements.